May 17, 1960  J. H. BUTLER ET AL  2,936,542
LIVE BAIT BOX
Filed Oct. 14, 1957  2 Sheets-Sheet 1
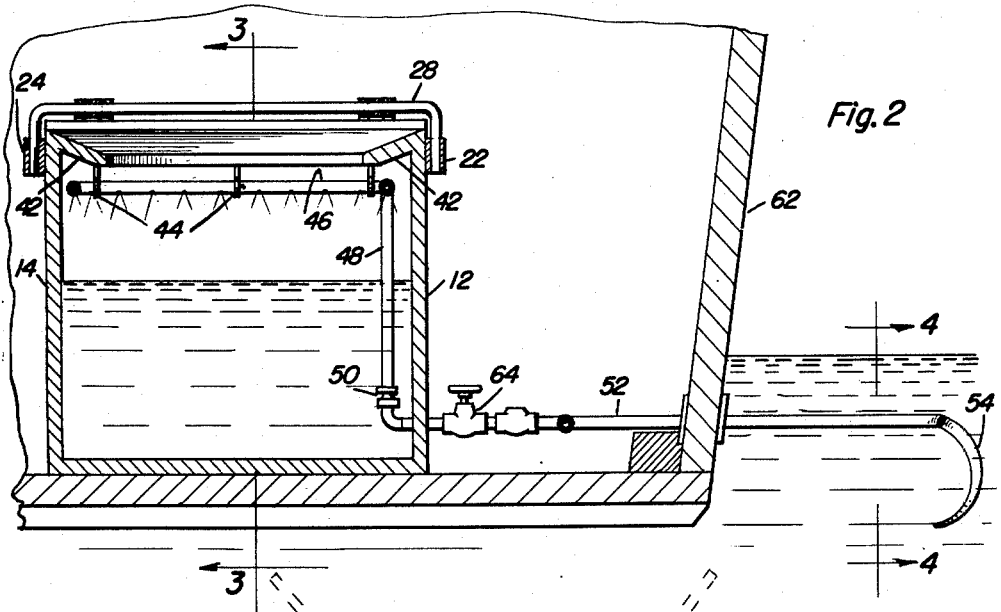
Fig. 2
Fig. 3
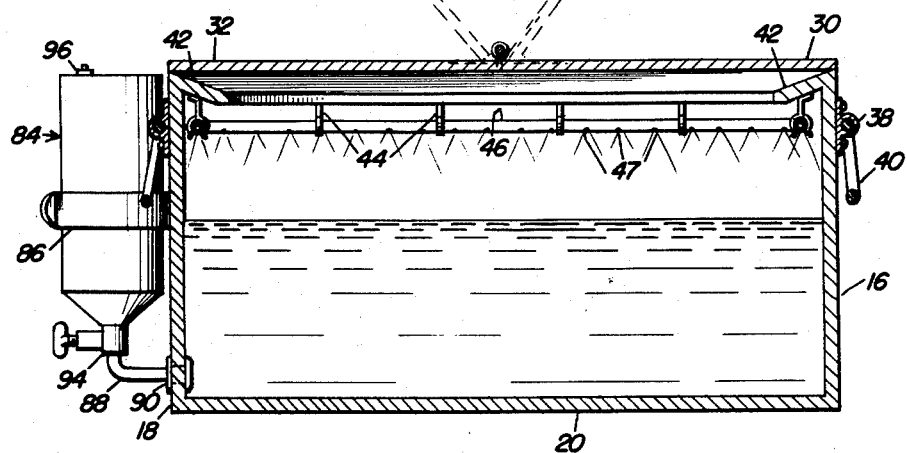
James H. Butler
Charles E. Atherton
INVENTORS

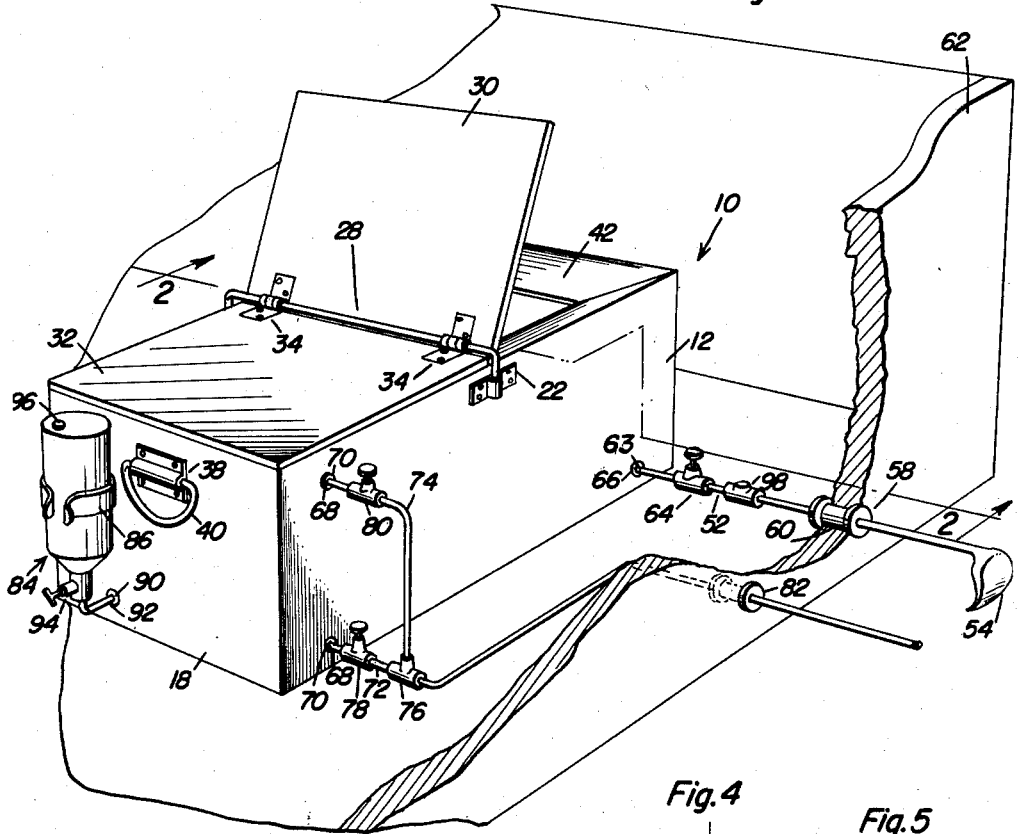
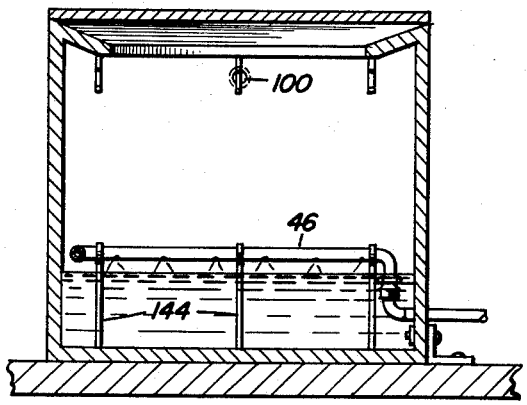
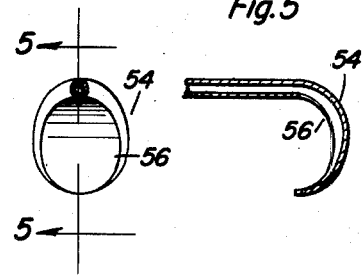
James H. Butler
Charles E. Atherton
INVENTORS

United States Patent Office 2,936,542
Patented May 17, 1960

2,936,542

LIVE BAIT BOX

James H. Butler, Sulphur, and Charles E. Atherton, Maplewood, La.

Application October 14, 1957, Serial No. 689,846

1 Claim. (Cl. 43—57)

This invention relates generally to a container for storing live bait, and more specifically to a portable, splashproof, live bait container that can be supplied with water, air, or other life sustaining substance for fish or fish bait to be kept alive for an indefinite period of time.

When sportsmen go fishing they encounter the problem of how to keep the bait alive for long periods of time. Previously, fishermen would store their live bait or fish in an enclosed container open at the top. However, when this was done the water quickly became stagnant and the bait and fish either died or became inactive. In order to keep the bait or fish in proper condition it is necessary to supply the bait or fish with water, gas, or other life sustaining material. It is therefore a primary object of this invention to provide an improved live bait box, which is constructed so that it may constantly provide the live bait or fish with fresh water or gas.

Another object of this invention is to provide a cylinder attached to the live bait box, designed to hold compressed gases or liquid which is connected so that when the compressed gases or liquids are released they will flow into the bait box or container and thus agitate the water in the container to refreshen the water and increase the life span of the bait or fish when a supply of fresh water is not available, as when the box is being transported by car or such from one location to another.

Another object of this invention is to provide an improve bait box which may be readily made portable and installed in a boat, or moved from one boat to another.

A further object of this invention is to provide an apparatus which will scoop-in water from a lake or stream in which the boat is traveling and circulate this water through the bait box without the use of a motor or any external force whatsoever, such apparatus operating when the boat is in motion.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the live bait box located in the back of a boat with a portion of the transom being broken away for purposes of clarity;

Figure 2 is an enlarged side sectional view taken subtantially upon a plane passing along section line 2—2 of Figure 1 and showing the details of the water scooping apparatus;

Figure 3 is a vertical sectional view taken substantially upon a plane passing along section line 3—3 of Figure 2 illustrating the details of construction thereof;

Figure 4 is a vertical sectional view taken substantially upon a plane passing along section line 4—4 of Figure 2 and illustrating the details of the water scoop;

Figure 5 is a vertical sectional view taken substantially upon a plane passing along section line 5—5 of Figure 4 and illustrating the shape and the opening of the water scoop; and Figure 6 is a view similar to that of Figure 2 showing a modification of the location of the spray loop.

Referring now specifically to the drawings, the numeral 10 generally designates a container which may be constructed of any suitable material. This container comprises four walls 12, 14, 16, and 18, and a bottom 20. Two loop shaped retainers 22 and 24 are located at the upper edge portions of walls 12 and 14, respectively. A rod-like member 28 which is bent so as to be angled at both ends is supported in the retainers, the angled portions of the rod member being located in the loops of the U-shaped retainers. Panel members 30 and 32 forming the top of the container have hinges 34—34 attached to their adjacent edges, and these hinges are pivotally mounted on the rod-like member 28. Two semi-circular shaped handles 40—40 are pivotally retained on side walls 16 and 18 by means of loop brackets 38—38, so as to enable the container to be readily carried from place to place.

At the upper edges of walls 12, 14, 16 and 18 are attached baffles 42 projecting downwardly and inwardly into the container which baffles help prevent liquid from splashing out when the container is jarred. To the underside of the baffles are attached longitudinally aligned spring clips 44 which engage and hold in place the several portions of a spray loop 46. The spray loop is slightly smaller than the dimensions of the container and is constructed to be the same shape as the container. On the underside of the spray loop are located many orifices 47 which act to spray fresh water onto the live bait or fish in a manner which will be explained below.

Depending downwardly from the spray loop is a pipe section 48 which connects the spray loop 46 to an inlet pipe 52. The pipe section 48 may be secured to the spray loop 46 and the inlet pipe 52 by any suitable means as by threading an end of each pipe and screwing both pipes into a pipe fitting 50. On the end of inlet pipe 52 is a scoop 54 which is of a curved shape. On the inwardly curved portion of scoop 54 is an opening 56, which is so adapted as to scoop-in water when the scoop is moved forwardly through a body of water, and force this water through the inlet pipe 52 up through the pipe section 48 and finally into the spray loop 46 from where the water is sprayed into the container through the orifices 47. As can be seen from Figures 1 and 2 the live bait box is being shown as it would be used with a boat and the inlet pipe 52 is mounted so as to fit through a spool shaped gasket 58 which is mounted in an opening 60 in the transom 62 of a boat. The scoop is mounted externally of the transom of the boat and the opening 60 in the transom is so located that the scoop 54 is located below the surface of the water. With this type of arrangement, as the boat is moved through the water, some of the water will be forced up through the scoop into inlet pipe 52 and finally into the container. It will be readily realized that the rate of flow through the container will depend on the size of the scoop and the inlet pipe, as well as the speed of the boat. In order to control the inlet flow of the water an inlet valve 64 is provided on the inlet pipe 52. It is to be noted that the inlet pipe 52 enters the container through an opening 63 in wall 12, the opening having a gasket 66 therein surrounding the inlet pipe 52 so as to prevent leakage. Located at the opposite end of wall 12 are two openings 68 similar to opening 66, and into these openings are inserted gaskets 70—70. Into these gaskets are inserted two pipes, namely, outlet pipe 72 and overflow pipe 74. Overflow pipe 74 communicates with outlet pipe 72 by means of a T-fitting 76. Provided on the pipe 72 is an outlet valve 78, and provided on the overflow pipe 74 is an overflow valve 80. The outlet pipe 72 is mounted similarly to the inlet pipe 52 so as to communicate with the water externally of the boat, and this is done by inserting the outlet pipe 72 through a spool shaped gasket 82 which gasket is mounted in an opening in transom 62. It may now be seen that an apparatus has been set up which will allow fresh water to flow through the tank at all times when the boat is in motion. Furthermore, the control of such flow is possible by use of the valves 64, 78 and 80. For instance, as the boat reaches a high speed the inlet flow may be faster than desired and so this may be controlled by means of inlet valve 64. If the valve 78 is kept closed and valve 80 kept open the water level in the container will be level with overflow pipe 74, however, if a rapid change of water is required and the inlet flow proves to be greater than the overflow, the level in the container may be kept constant by an adjustment of valve 78.

There will be times when the boat is not in motion, so in order to keep the water aerated and/or agitated a cylinder designated generally by the numeral 84 is secured to wall 18 of the container by means of a spring clip 86. An L-shaped pipe section 88 communicates the cylinder with the container. This L-shaped pipe section 88 is inserted into a spool shaped gasket 90 which is mounted in an opening 92 near the bottom of wall 18. Between the L-shaped pipe section 88 and the cylinder is a control valve 94 which controls the flow of a compressed fluid from the cylinder into the container. This compressed fluid may be a gas or a liquid which is inserted into the cylinder and then may be put under pressure by means of an ordinary automobile tire pump connected to cylinder inlet valve 96 which is made in the form of an ordinary automobile tire valve. It has been found that oxygen and compressed air work sucessfully when inserted into the cylinder.

When the boat is not in motion it is merely necessary to open valve 94, which will allow the compressed fluid to enter the container and this will agitate and aerate the water so as to keep it fresh and thus increase the life and span of bait many times what it would have been without fresh water. However, it must be remembered that when the boat is stopped outlet valve 78 should be closed so as to retain water in the container. Provided on the inlet pipe 52, is a check valve 98 which operates to prevent the water in the container from escaping when the boat has stopped.

In Figure 6 may be seen a modification of the device just described. The only difference between this and the previously described device, is that the spray loop 46 may be moved to a lower position in the container and held in place by a second set of spring clips 144. Of course, this will also necessitate some adjustment of pipe section 48 since this will have to be shortened because of the loop being closer to the inlet pipe 52.

An additional inlet connection 100 is shown attached to wall 16 and this is provided so that water supply hose may be attached to this inlet at home or some other place, to enable the fisherman to preserve the life of the bait indefinitely if the outlet valve is open and water allowed to circulate through the container.

It can thus be seen that we have invented a portable, splashproof, live bait container. It is to be noted that the scoop may be adapted to be swiveled up out of the water for handling the boat in shallow water for loading and transporting, which may be done by any suitable means well known in the art. The scoop may be so constructed as to be readily removed. The container may be secured in the boat by any suitable means, as by fastening angle irons to the boat and to the container. Then, to remove the container for transportation it is merely necessary to remove the scoop, remove the fasteners from the angle iron, and slide the inlet and outlet pipes out of their respective openings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A live bait box comprising a container having inlet and outlet means connected thereto, spray means located in said container and communicating with said inlet means, circulating means adapted to circulate a liquid through said container, a cylinder designed to hold compressed fluids detachably secured to said container and communicating with said container at a point below the level of the liquid in the container, said circulating means being in the form of a scoop adapted to be submerged in a liquid in such a manner that the liquid may be forced therethrough and through said spray means upon movement of said container in relation to said liquid, said scoop communicating with the inlet means, said spray means comprising a loop formed of tubing mounted inside the perimeter of the container and said tubing having a plurality of orifices in the underside thereof, said loop communicating with said inlet means, and baffles mounted at the upper edges of the container and sloping inwardly and downwardly therefrom, so as to decrease the open area of the top of the container and prevent liquid from splashing out of the same.

References Cited in the file of this patent

UNITED STATES PATENTS

| | | |
|---|---|---|
| 710,325 | Kern | Sept. 30, 1902 |
| 782,065 | Shaler | Feb. 7, 1905 |
| 1,616,125 | Holman | Feb. 1, 1927 |
| 2,002,572 | Forbes et al. | May 28, 1935 |
| 2,151,225 | Newton | Mar. 21, 1939 |
| 2,473,874 | Ganong | June 21, 1949 |
| 2,485,684 | Aldredge | Oct. 25, 1949 |
| 2,587,834 | Goode | Mar. 4, 1952 |
| 2,639,906 | Butler | May 26, 1953 |

FOREIGN PATENTS

| | | |
|---|---|---|
| 68,398 | Sweden | May 11, 1928 |